(12) United States Patent
Trajkovska-Petkoska et al.

(10) Patent No.: US 7,713,436 B1
(45) Date of Patent: May 11, 2010

(54) ELECTRICALLY ACTUATABLE DOPED POLYMER FLAKES AND ELECTRICALLY ADDRESSABLE OPTICAL DEVICES USING SUSPENSIONS OF DOPED POLYMER FLAKES IN A FLUID HOST

(75) Inventors: Anka Trajkovska-Petkoska, Rochester, NY (US); Stephen D. Jacobs, Pittsford, NY (US); Kenneth L. Marshall, Henrietta, NY (US); Tanya Z. Kosc, Rochester, NY (US)

(73) Assignee: The University of Rochester, Rochester, NY (US)

( * ) Notice: Subject to any disclaimer, the term of this patent is extended or adjusted under 35 U.S.C. 154(b) by 1264 days.

(21) Appl. No.: 11/230,059

(22) Filed: Sep. 19, 2005

(51) Int. Cl.
  *C09K 19/02* (2006.01)
  *C09K 19/52* (2006.01)
  *G02F 1/1334* (2006.01)
  *G02F 1/17* (2006.01)
  *G02F 1/19* (2006.01)

(52) U.S. Cl. .............................. 252/299.01; 252/299.2; 252/299.5; 252/299.7; 428/1.1; 349/86; 349/88; 359/267

(58) Field of Classification Search ................... 428/1.1; 252/299.01, 299.2, 299.5, 299.7; 349/86, 349/88; 359/267
  See application file for complete search history.

(56) References Cited

U.S. PATENT DOCUMENTS

| | | | |
|---|---|---|---|
| 4,168,986 A | 9/1979 | Venis, Jr. | |
| 5,059,245 A | 10/1991 | Phillips et al. | |
| 5,279,657 A | 1/1994 | Phillips et al. | |
| 5,571,624 A | 11/1996 | Phillips et al. | |
| 5,587,242 A | 12/1996 | Hou et al. | |
| 5,672,410 A | 9/1997 | Miekka et al. | |
| 5,766,738 A | 6/1998 | Phillips et al. | |
| 6,136,251 A | 10/2000 | Etzbach et al. | |
| 6,392,785 B1 | 5/2002 | Albert et al. | |
| 6,394,595 B1 | 5/2002 | Jiang et al. | |
| 6,422,687 B1 | 7/2002 | Jacobson | |
| 6,445,490 B1 | 9/2002 | Chopra et al. | |
| 6,497,942 B2 | 12/2002 | Sheridon et al. | |
| 6,498,674 B1 | 12/2002 | Sheridon | |

(Continued)

*Primary Examiner*—Shean C Wu
(74) *Attorney, Agent, or Firm*—Kenneth J. Lukacher; Martin Lukacher

(57) ABSTRACT

Doped electrically actuatable (electrically addressable or switchable) polymer flakes have enhanced and controllable electric field induced motion by virtue of doping a polymer material that functions as the base flake matrix with either a distribution of insoluble dopant particles or a dopant material that is completely soluble in the base flake matrix. The base flake matrix may be a polymer liquid crystal material, and the dopants generally have higher dielectric permittivity and/or conductivity than the electrically actuatable polymer base flake matrix. The dopant distribution within the base flake matrix may be either homogeneous or non-homogeneous. In the latter case, the non-homogeneous distribution of dopant provides a dielectric permittivity and/or conductivity gradient within the body of the flakes. The dopant can also be a carbon-containing material (either soluble or insoluble in the base flake matrix) that absorbs light so as to reduce the unpolarized scattered light component reflected from the flakes, thereby enhancing the effective intensity of circularly polarized light reflected from the flakes when the flakes are oriented into a light reflecting state. Electro-optic devices contain these doped flakes suspended in a host fluid can be addressed with an applied electric field, thus controlling the orientation of the flakes between a bright reflecting state and a non-reflecting dark state.

33 Claims, 5 Drawing Sheets

U.S. PATENT DOCUMENTS

| | | |
|---|---|---|
| 6,515,649 B1 | 2/2003 | Albert et al. |
| 6,665,042 B1 | 12/2003 | Marshall et al. |
| 6,829,075 B1 | 12/2004 | Kosc et al. |
| 7,042,617 B2 | 5/2006 | Kosc et al. |
| 7,081,282 B2 * | 7/2006 | Kuntz et al. .................. 428/1.6 |
| 2004/0173927 A1 | 9/2004 | Trajkovska-Petkoska et al. |

* cited by examiner

ELECTRICALLY ACTUATABLE DOPED POLYMER FLAKES AND ELECTRICALLY ADDRESSABLE OPTICAL DEVICES USING SUSPENSIONS OF DOPED POLYMER FLAKES IN A FLUID HOST

The U.S. Government has rights in this invention pursuant to contract DE-FC52-92SF19460 between The University of Rochester and The Department of Energy.

The present invention relates to electrically addressable optical devices using suspension of doped electric field responsive polymer [preferably polymer liquid crystal (PLC) flakes] in a fluid host. Such devices have applications in information displays, variable optical coatings, shutters, switchable filters, retarders, polarizers, wavelength selective mirrors in fiber optic channels, and other applications and uses in the field of optics, photonics and information display. The flakes themselves may have improved optical characteristics by virtue of the doping thereof with a light absorbing material, such as an insoluble or soluble carbon-based dopant.

The base matrix of the flakes as described herein is a polymer cholesteric liquid crystal material. It should be understood that other electrically active polymers, as discussed in patents naming one or more of the applicants hereof as inventors, may also function as the base matrix. The dopant used is preferably composed of microscopic particles generally sized in the nanometer (nm) range, but in all cases much smaller than the flakes in size.

More specifically the invention provides platelet-like particles in the form of flakes of PLC material [preferably, polymer cholesteric liquid crystal (PCLC) material] as a base matrix that contains at least one additional material distributed within the base flake matrix as a dopant. Generally, the dopant materials have higher dielectric permittivity and/or conductivity than the PLC material in which they are dispersed. Depending upon the composition of the material and/or the concentration of the dopant in the base flake matrix, selected optical and electrical properties may be obtained or adjusted, particularly when the flakes are used in electro-optic devices in which the flakes are suspended in a host fluid and addressed or switched between different orientation states in response to an applied electric field.

Reference may be made to patents issued to one or more of the inventors hereof, and incorporated by this reference herein, which describe electrically addressable or switchable optical devices using systems of polymer flakes suspended in a fluid host and exhibiting different effects in response to applied electric fields. These patents are Marshall et al., U.S. Pat. No. 6,665,042 issued Dec. 16, 2003 and Kosc et al., U.S. Pat. No. 6,829,075 issued Dec. 7, 2004. Such devices as described in these patents, as well as methods of making them, are also contained in articles appearing in the scientific literature authored or co-authored by one or more of the inventors hereof, such as, T. Z. Kosc et al, "Progress in the Development of Polymer Cholesteric Liquid Crystal Flakes for Display Applications", *Displays*, Oct. 14, 2004, pp. 1-6; and Anka Trajkovska-Petkoska et al., "Enhanced Electro-Optic Behavior for Shaped Polymer Cholesteric Liquid Crystal Flakes Made Using Soft Lithography", *Adv. Fund. Mater.* 2005, 15, No. 2, February.

It has been found, in accordance with the invention, that doped flakes provide useful electro-optic devices that employ polymer flakes suspended in a host fluid with enhanced capability by enabling the use of host fluids with substantially lower dielectric permittivity and conductivity than would normally be possible using the undoped flakes described in the prior art. Such devices provide for improved electro-optical control of flake reorientation, including reduced voltages requirements for switch them into and out of an optically reflective state. The use of dopants enables a wider selection of host materials than heretofore described in the above referenced patents and publications. The dopants may be distributed either homogeneously (uniformly) throughout the body of each flake, or non-homogeneously in accordance with selected concentration gradients or different dopant materials in difference regions of the flake. Such non-homogeneous flakes also enhance the operating capabilities of the devices containing them by enabling individual flakes or groups of flakes containing different dopant characteristics (material compositions, concentrations, or distributions) to be specifically addressed with applicable electric fields. These flakes with differing dopant characteristics may be micro-encapsulated and distributed in a controlled manner in different areas of a display panel to provide individually field-selectable reflectivity for pixels or sub-pixels of different colors, as in a RGB color display monitor for computer graphics, still images, or video images.

Another improvement provided by electro-optic devices utilizing systems of doped flakes suspended in a fluid host is an enhanced ability to operate both in DC and AC electric fields, as well as in DC fields without the restrictive requirement for a fluid host with high electrical conductivity.

The flakes may be doped with insoluble particles such as titanium dioxide, barium titanate, carbon based particles (e.g., carbon black or carbon nanotubes) and metal particles, such as microscopic iron particles. Such doping increases the dielectric permittivity and/or conductivity of the flakes and enable the devices to better provide field controlled, angle dependent optical properties, such as reflection by interference effects in the PLC component of the flake, than undoped PLC materials. Another advantage of doping of the PCLC flake base matrix is that if a dopant that has a substantially higher density than the base flake matrix is used, it allows a broader choice of fluid hosts to be used, as the density of the doped PCLC flake base matrix can be adjusted to allow the flake density and the fluid density to be exactly matched.

Unlike the undoped flakes described in the prior art, doped flakes may be suspended in a highly insulating host fluid, such as silicone oil of low conductivity, and still be re-orientable over a full 90° range of rotation. Such re-orientation is faster, and more certain by virtue of the dopant, relative to undoped flakes. One factor may be due to the ability of electric charges responding to the activating fields to travel more quickly through the body of the doped flake (between opposite surfaces thereof) than to travel the longer distance over both surfaces of an undoped flake when the flakes are immersed in a host fluid with a low conductivity and dielectric permittivity. Doping thus enhances the electro-optical switching mechanism that causes reorientation of the flakes from a highly reflective state non-reflective state (aligned parallel to the substrates) to their dark, non-reflective state when they are aligned normal to the substrates and parallel to the applied field. The increased conductivity of the doped flake enhances the ability to use readily available, commercial silicone oils as the host fluid. Silicone oils are stable and inert materials, and may be adjusted in such properties as density, viscosity, and index of refraction. Silicone oils also facilitate microencapsulation of the flake/fluid host suspension into as fluid-filled voids within the body of a polymer film or as discrete microcapsules that can be isolated and re-dispersed into an appropriate film-forming binder to produce flexible electro-active polymer films providing different color effects (e.g., RBG) in a rigid or flexible display panel.

Improved flakes provided by the invention also enable the enhancement of color effects by the use of light absorbing, insoluble particulate dopants, such as carbon black or carbon nanotubes. Such a dopant improves the device switching contrast by providing a black background to absorb any scattered or transmitted light that is not selectively reflected, thus enhancing the saturation of the reflected light. Alternatively, an oil soluble organic dye can be dissolved and dispersed into the PLC to provide a similar optical absorbing function. The dielectric or conductive properties of the flake can also be altered and adjusted by the soluble dye if it is introduced in sufficient quantity, thus allowing the soluble organic dye to also function as a dopant for adjusting the flake conductivity and dielectric permittivity.

In devices provided by the invention where doped PCLC flakes have a non-homogeneous distribution of dopant across the body of the flakes, the resulting gradient in the dielectric properties may be used to gain specific control over the flake switching dynamics. Another advantage, which was also noted above, is provided in devices using different color groups of PLC flakes (e.g., RBG) with each color group containing either different dopants or different combinations of the same dopant. This selective doping capability thereby enabling selective response of groups of flakes which may contained in individual microcapsules or groups of microcapsules residing in pixels or sub-pixels in a display panel. Such differently doped flakes with different dielectric properties and colors may be specifically addressed so as to create graphics, still images and video displays upon addressing thereof, for example with different electric fields produced by different DC voltage levels or different AC drive waveforms and frequencies.

Accordingly, it is a feature of the invention to provide improved electrically controllable flakes, the control of which in response to a field is enhanced by doping of the flakes either with a homogeneous or non-homogeneous distribution of either insoluble particulate dopants or soluble dopants based on carbon-containing organic dyes.

It is another feature of the present invention to provide electrically-addressable optical devices using suspensions of doped, electric field responsive flakes, such as PLC and particularly PCLC flakes, in a fluid host.

Briefly described, an optical device provided by the invention includes a system of flakes suspended in a fluid host. These flakes are composed of a base material matrix that can be reoriented in response to an electric field applied to the flake/fluid host suspension to effect the propagation of optical energy incident thereon. The base flake matrix is composed of preferably a PLC material, such as PCLC material. The dopant material may be either an insoluble particulate material or a oil-soluble (solvent-soluble) organic compound that can be distributed in the base flake matrix. The distribution of dopant may be either homogenous or inhomogenous. This dopant changes the electro-optical response characteristics of the flakes to an applied electric field. Doped flakes can be formulated to have dielectric properties that are substantially different from a wide variety of potential host materials, which greatly enhances both the switchability of the flakes and the choice of host fluids. This large difference in dielectric properties is achieved either (1) by using dopants that have very high dielectric permittivities and/or conductivities in various concentrations in the base flake matrix, or (2) using larger amounts of dopants with dielectric permittivities that are smaller that those referred to in (1) above but are still greater than the dielectric permittivity or conductivity of either the base flake matrix or the fluid host. This approach maximizes the degree of control over the switching properties of the flakes. Where the dopant is a light absorbing material (for example, either insoluble carbon black particles or a soluble organic dye), it enhances the device switching contrast by absorbing the unpolarized scattered light component reflected from the flakes, thereby enhancing the effective intensity and saturation of the reflected circularly polarized light from the flakes when they are oriented into a light reflecting state.

The foregoing and other objects, features and advantages of the invention will become more apparent from a reading of the following description in connection with the accompanying drawings in which.

Figure 1A:
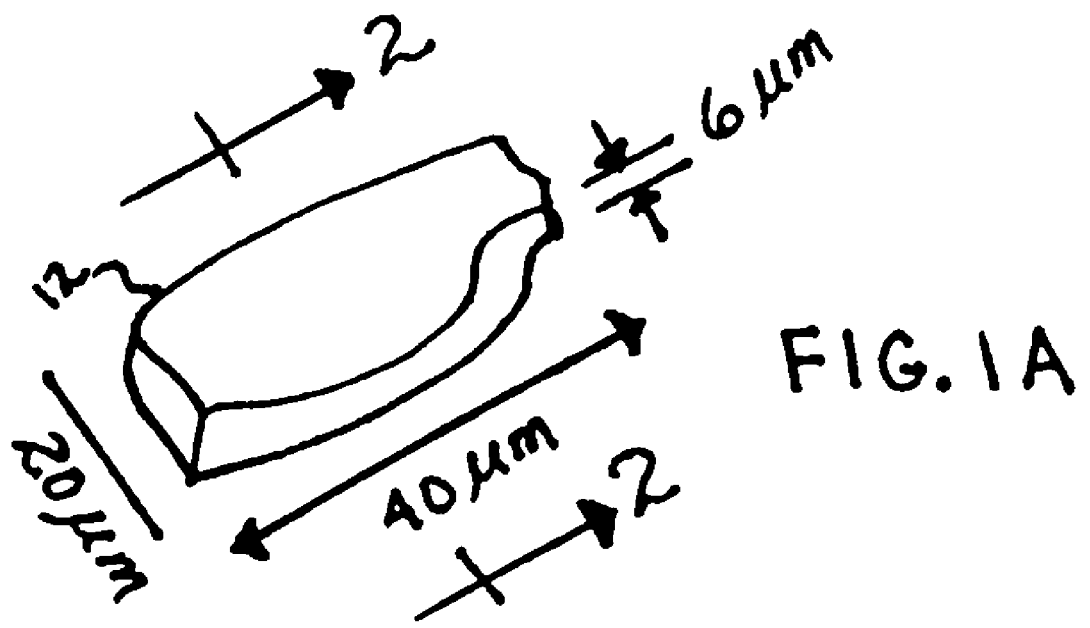
FIG. 1A is a perspective view of a typical irregularly shaped flake which is usable in a flake/host system of an optical device provided by the invention, particularly in a cell containing the system as shown in FIGS. 1B and 1C.
Figure 1B:
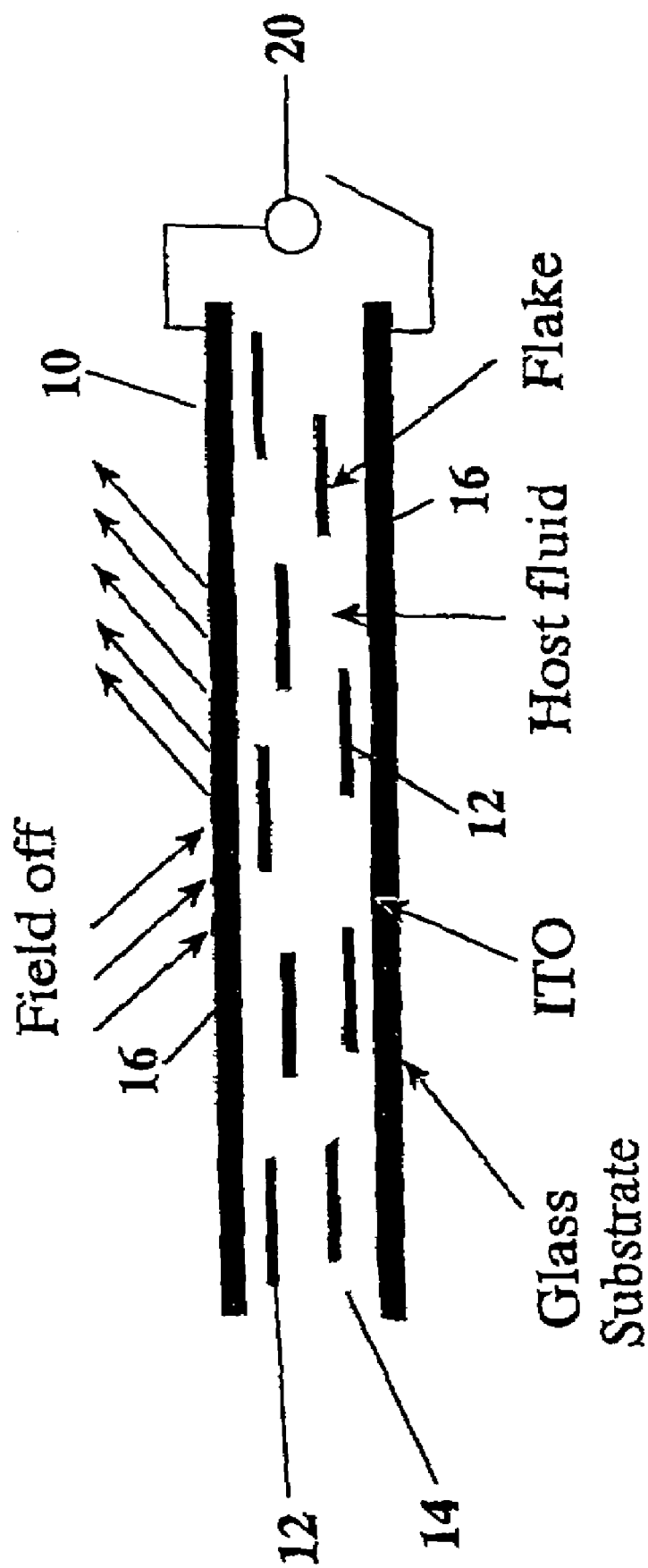
FIG. 1B is a schematic diagram of a cell incorporating the flake/host system wherein the flakes lie approximately parallel to the cell substrates or walls, which is what occurs when no electric field is applied.
Figure 1C:
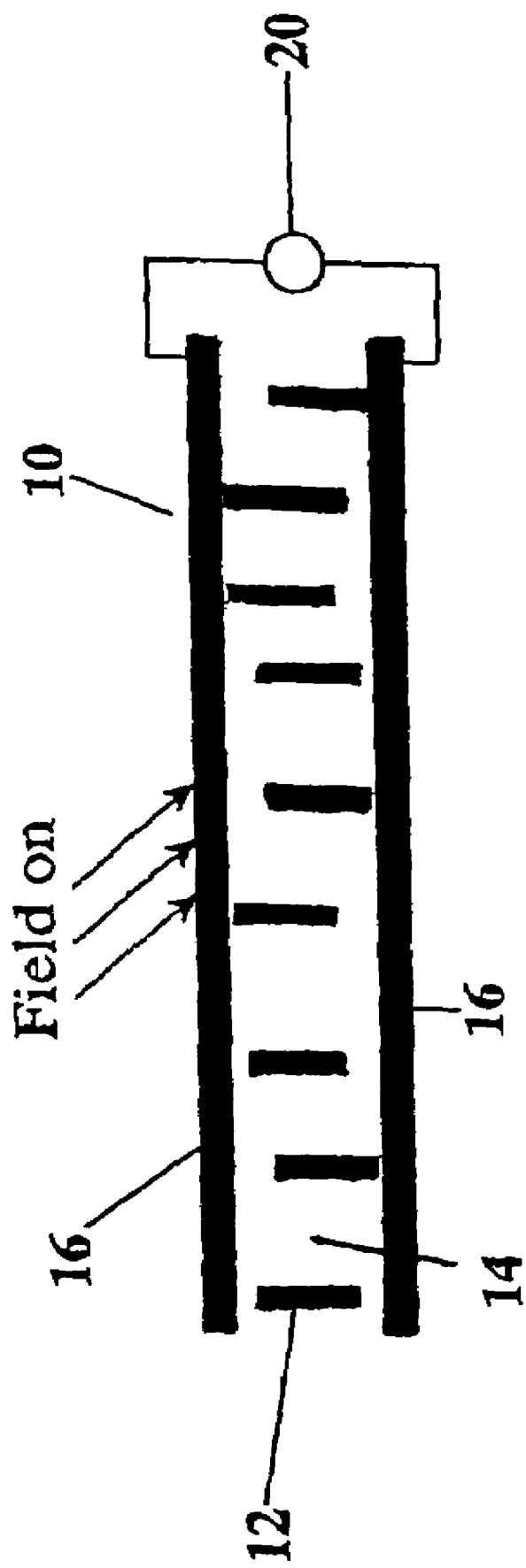
FIG. 1C is a view similar to FIG. 1B that shows the flakes reoriented with their long axis parallel to a field that is applied perpendicular to the substrates.
Figure 2:
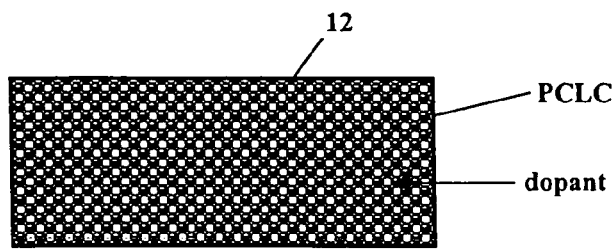
Figure 2:
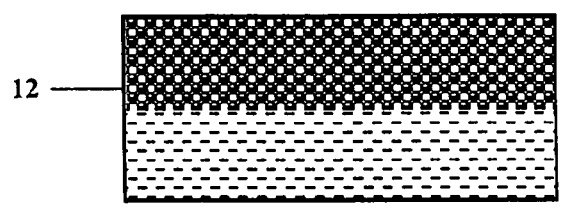
Figure 2:
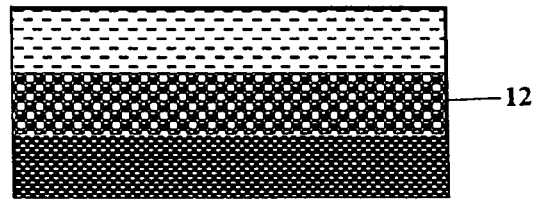
Figure 2:
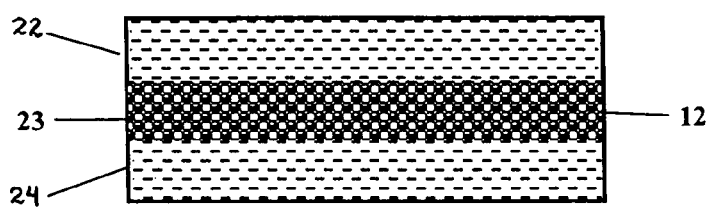
Figure 2:
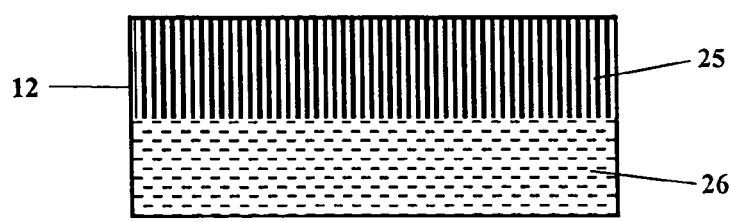

FIGS. 2(a), 2(b)1, 2(b)2, 2(c), and 2(d) are sectional views of different doped flakes having either homogeneous (FIG. 2(a)) or various non-homogeneous distributions of dopant particles, the views being taken along the line 2-2 in FIG. 1A.

FIGS. 3(a)-(d) are perspective views of a device according to the invention which illustrate suspensions of flakes that show selective reflection in different parts of the spectrum (for example, RGB reflectivity) where the system of doped flakes is encapsulated in an array of spherical microcapsules, such a device being similar to the devices illustrated in the above referenced U.S. Pat. No. 6,665,042, particularly in FIGS. 4-7 thereof, and more particularly, wherein different selective dielectric characteristics in different groups of the flakes, which characteristics correspond to different color reflectivity of light, is obtained by the use of doped flakes in accordance with the invention.

Referring to FIGS. 1A-1C, the basic device 10 embodying the invention represents a cell having a suspension of doped PCLC flakes 12 in host fluid 14, which provides a flake/fluid host system. The system, except for the use of doped flakes in accordance with the invention, is described in the above referenced patents.

A typical device 10 is constructed using an indium tin oxide (ITO) coated glass substrate 16 (in contact with the suspension), although a flexible polymer substrate can also be used. A uniform cell gap between the substrates 16 may be set by spacers (e.g., beads, fibers, or gaskets), and the device 10 may be filled with the flake/host fluid suspension 14 using capillary action. The device 10 is preferably driven with either a DC or an AC electric field from a source 20. By utilizing doped flakes in accordance with the invention, control by DC and low frequency AC driving fields is enhanced.

PCLC flakes 12 in the flake/host fluid system respond to electric fields by rotating about one axis, most commonly that which is parallel to the longest flake dimension. A typical flake 12 is shown in FIG. 1A. Flakes lying in the plane defined by the substrate reflect brightly (FIG. 1B), but once they reorient perpendicular to the substrate, little light is reflected (FIG. 1C).

The preferred host fluid is a non-conductive silicone oil.

Exemplary doped flakes 12 are shown in FIGS. 2(a)-2(d). These doped flakes have a PCLC base matrix in which the doping is provided by insoluble microscopic particles distributed in the base matrix. Suitable particulate dopants may be one or more of the following; titanium dioxide (preferably rutile), barium titanate, carbon black, carbon nanotubes, and metal particles. The composition and concentration of the particulate dopant or dopants is selected in order to provide a desired dielectric permittivity and/or conductivity. Alternatively, the dopant may be an oil soluble (solvent-soluble) dye. The dopants may be commercially available. The following articles may be referred to for more information on the dopants.

For carbon black dopants, see M. T. Connor et al., "Broadband AC Conductivity of Conductor-Polymer Composites", *Physical Review* B, 57 (4), 1998; H. Zois et al., "Electrical Properties of Carbon Black-Filled Polymer Composites", *Macromol. Symp.* 170, 249-256, 200; and I. A. Tchmutin et al., "Electrical Transport in 0-3 Epoxy Resin-Barium Titanate-Carbon Black Polymer Composites", *J. Polym. Sci.: Part B: Polymer Physics*, 36, 1847-1856, 1998.

Oil soluble dye dopants may be Sudan Black B, available from Sigma Aldrich Chemical Co., and Orasol Black BL, which is a commercially available textile dye.

For carbon nanotube dopants, see I. A. Tchmutin et al., "Electrical Properties of Composites Based on Conjugated Polymers and Conductive Fillers", *Carbon*, 41, 1391-1395, 2003; S. Barrau et al., "DC and AC Conductivity of Carbon Nanotubes-Polyepoxy Composites", *Marcom.*, 36, 5187-5194, 2003; and J. Obrzut et al., "High Frequency Loss Mechanism in Polymers Filled with Dielectric Modifiers", *Mat. Res. Soc. Symp. Proc.*, 783, 2004.

The metal dopant may be carbonyl iron, such as described in the following article, J. Obrzut et al., "High Frequency Loss Mechanism in Polymers Filled with Dielectric Modifiers", *Mat. Res. Soc. Symp. Proc.*, 783, 2004.

Articles describing titanium dioxide dopants are described in following articles: A. Dey et al., "Characterization and Dielectric Properties of Polyaniline-$TiO_2$ Nanocomposites", *Nanotechnology*, 15, 1277-1283, 2004; and J. K. Nelson et al., "Internal Charge Behavior of Nanocomposites", *Nanotechnology*, 15, 586-595, 2004.

Barium titanate ($BaTiO_3$) dopants are described in the following articles: T. Furukawa et al., Dielectric and Conductive Spectra of the Composite of Barium Titanate and $LiClO_4$-Doped Polyethylene Oxide", *IEEE Transactions on Dielectrics and Electrical Insulation*, 11 (1), 2004; R. Popielarz et al., "Dielectric Properties of Polymer/Ferroelectric Ceramic Composites from 100 Hz to 10 GHz," *Macrom.*, 34, 5910-5915, 2001; and N. Noda et al., "High Frequency Dielectric Relaxation in Polymers Filled with Ferroelectric Ceramics", *Materials Research Society Symposium Proceedings*, 2002.

FIG. 2(a) shows a uniform distribution of a dopant. FIGS. 2(b)1 and 2(b)2 show a non-uniform or non-homogeneous dopant distribution that forms different concentration gradients. In FIG. 2(c), the non-homogeneous distribution is formed by layers 22, 23 and 24 that contain different concentrations of the same dopant, which results in a concentration gradient. A similar layered composition that makes use of two different dopants 25 and 26 at different concentrations is shown in FIG. 2(d).

An example of a method used to make the flakes shown in FIG. 2(a) (homogeneous distribution of dopant) may be as follows: The amount of dopant required to obtain the desired dopant concentration is dispersed in a solvent, such as dichloromethane or toluene, in which an electric optic polymer material (in this case, PCLC material) has been previously dissolved. The dopant is dispersed in the PCLC solution by ultrasonication for an interval between thirty minutes and six hours to form a homogeneous suspension of dopant in the PCLC solution. The suspension is then poured in a mold or cast on a substrate. After the solvent is evaporated and the material solidifies, it is formed into flakes. The flakes may be formed using a flexible mold as described in U.S. patent application Ser. No. 10/383,603, filed Mar. 7, 2003, now U.S. Pat. No. 7,238,316 by Anka Trajkovska-Petkoska et al. This flexible molding technique is also described in the above referenced articles. Flakes may also be produced by methods such as described in S. Faris et al., U.S. Pat. No. 5,364,557, which is also referenced in the U.S. patent application Ser. No. 10/383,603.

Methods of making flakes with a the non-homogeneous dopant distribution shown in FIGS. 2(b)1, 2(b)2, 2(c) and 2(d) may be as follows: Crushed PCLC powder is mixed with the dopant particles and pressed at elevated temperatures and pressures using a high pressure, heated press in a manner similar to that used in powder metallurgy (approximately twenty tons per square inch of pressure). Using this technique, the powders are pressed into discs which can then be fractured into flakes. The dopants may be in different concentration in layers which are formed separately and then sequentially pressed into a single multi-layer disc, or the same process can be used employing different dopants at different concentrations in each sequential layer as shown in FIG. 2(d). Another method for making doped flakes may be hot pressing a PLC/dopant mixture into a thin foil onto a surface coated with a mold-release agent, which then acts as a mold to produce a free-standing film. The PCLC material and dopant may be in different concentrations or different dopant materials may be mixed with the PLC to provide the non-homogeneous flakes (flakes with a concentration gradient formed of different material as shown in FIGS. 2(b)1, 2(b)2, 2(c) and 2(d).

The possible dopants which may be used in accordance with the specific illustrative examples of the invention are listed in Table 1:

TABLE 1

| Dopant | Manufacturer | Dimensions of the particles | Dielectric constant |
|---|---|---|---|
| Carbon black, Vulcan PA 90 (CB VPA90) | Cabot Corporation, Special Black Division, Billerica, MA | 17 nm, spheres (conductive) | N/A |
| Carbon black Monarch 120 (CB M120) | Cabot Corporation, Special Black Division, Billerica, MA | 75 nm, spheres (nonconductive) | N/A |
| $TiO_2$-rutile, s spheres (s) | Marketech International, Inc., Port Townsend, WA | 30 nm, spheres | 200-160 ($10^4$-$10^7$ Hz) |
| $TiO_2$-rutile, n needles (n) | Nano-structured/ Amorphous Materials, Inc., Los Alamos, NM | 10 nm diameter x 40 nm length, needle-like | N/A |
| $BaTiO_3$ | Sigma-Aldrich | 70 nm, spheres | N/A |
| Single walled carbon nanotubes, AP | CarboLex, Inc., Lexington, KY | N/A | N/A |
| Carbonyl Iron, CI-HQ | BASF, Ludwigshafen, Germany | 1.1 µm, spheres | N/A |

Various examples of different concentrations of different dopants and their resulting dielectric constant are shown in Table 2. The first entry in Table 2 is for undoped PCLC material. This table therefore shows the increase in dielectric constant provided by the different PLC/dopant mixtures in the flakes.

TABLE 2

| PCLC/X* | Composition [vol. %] | Dielectric constant at 100 kHz ($\epsilon_m$) |
|---|---|---|
| PCLC/0 | 100/0 | 2.1 |
| PCLC/TiO$_2$,n | 78/22 | 7.6 |
| PCLC/TiO$_2$,s | 75/25 | 14.1 |
| PCLC/CI-HQ | 92.5/7.5 | 3.0 |
| PCLC/BaTiO$_3$ | 76.1/23.9 | 7.7 |
| PCLC/CB VPA90 | 95.6/4.4 | 9.3 |

*X—dopant.
s—spheres;
n—needles.

The preferred host fluid is a silicone oil. Details on the silicone oils which may be used for the host are specified in Table 3. Such oils are commercially available, one source being given in the Table.

TABLE 3

| Silicone oil* | Viscosity [cSt] | Density [g/cm$^3$] | Dielectric constant at 100 kHz ($\epsilon_h$) | Conductivity at 100 kHz [S/m] |
|---|---|---|---|---|
| DMS T00 | 0.65 | 0.764 | 2.18 | $1.3 \times 10^{-7}$ |
| DMS T01 | 1 | 0.820 | 2.10 | $0.6 \times 10^{-7}$ |
| DMS T05 | 5 | 0.918 | 2.55 | $2 \times 10^{-7}$ |
| DMS E01 | 1-2 | 0.995 | 6.60 | $4 \times 10^{-7}$ |

*products by Gelest Inc., Tullytown, PA

Table 4 describes different optical devices using different combinations of doped flakes. The percentage of the PCLC base matrix vs. the percentage of the dopant are illustrated in this table. By way of reference, the first line in Table 4 is for undoped PCLC flakes in two different silicone oils having different dielectric constants. The dielectric constant of the silicon oil host is $\epsilon_h$, while $\epsilon_p$ is the dielectric constant of the flake. The undoped flakes are provided for comparison with doped flakes to shown that undoped flakes and hosts having smaller differences in dielectric constants and thus will have longer reorientation times and higher applied voltage requirements than doped flakes.

It was found that undoped PCLC flakes did not undergo 90° reorientation in the DMS T01 host, even when very high voltages were applied (e.g., ±500 V applied to an 80 µm cell, which produces a field strength of 6 V/µm). In host DMS E01, which has both a higher conductivity and dielectric constant than DMS 501, much smaller applied voltages were required to produce full 90° reorientation of the same flakes. Below are given a few examples of doped flakes in different hosts:

EXAMPLE 1

In a low conductivity silicone oil with low dielectric constant ($\epsilon_r$=2.1) such as DMS T01, the increased dielectric permittivity and conductivity of doped flakes produces 90° reorientation with smaller applied voltages and faster reorientation times as compared to undoped flakes in the same host. For example, flakes doped with 27 vol. % TiO$_2$ (estimated dielectric constant of ~15 at 100 kHz) underwent full 90° reorientation in around 1 s when 250 V was applied.

EXAMPLE 2

In a low conductivity silicone oil with a moderately higher dielectric constant ($\epsilon_r$=2.6) such as DMS T05, lower applied voltages caused reorientation of doped PCLC flakes even though the viscosity was 5 times greater than that the host in Example 1. For example, 5 vol. % carbon black VPA doped flakes (estimated dielectric constant of ~10), required around 40 to 80 V for full 90° reorientation in the DMS T05 host. Both types of reorientation (along the longest and shorter axis of the flake) were observed.

EXAMPLE 3

In a silicon oil with a much higher dielectric constant ($\epsilon_r$=6.6) such as DMS E01, doped flakes reoriented a full 90° with a very low applied voltages, on the order of 1 V (either DC or very low-frequency AC). With this low applied DC voltage, TiO$_2$-doped flakes reoriented 90° about their long axis. When a very low frequency AC electric fields (0.001 to 1 Hz) was applied, these flakes also tried to follow the polarity of the field (the flakes oscillated between reflecting and non-reflecting states in sync with the field frequency). When the difference between the dielectric permittivities of the host and the doped flake was large, faster reorientation of flakes occurred. Specifically, when the difference in dielectric con-

TABLE 4

| Flakes | Dopant | Oil | $\epsilon_h$ | $\epsilon_p$ | ($\epsilon_p - \epsilon_h$) | Applied voltage/ 80 µm cell | Cell current density [mA/m$^2$] | Observation |
|---|---|---|---|---|---|---|---|---|
| Undoped | no | DMS T01 | 2.1 | 2.1 | 0 | ~500 V | 4.4 | no motion |
|  |  | DMS E01 | 6.6 | 2.1 | -4.5 | ~1 V | 40 | 90$^a$ reor. |
| Doped | 27 v. % TiO$_2$ (example 1) | DMS T01 | 2.1 | 15 | 12.9 | ~250 V | 5.3 | 90$^a$ reor. |
|  | 5 v. % CB |  |  | 10 | 6.9 | 450 V | 4.3 | 90$^a$ reor. along both axes |
| Doped | 27 v. % TiO$_2$ | DMS T05 | 2.6 | 15 | 12.4 | ~40 V | 2.7 | 90$^a$ reor., follow polarity |
|  | 5 v. % CB (example 2) |  |  | 10 | 10 | 6.4 | ~40 V | 6.9 | 90$^a$ reor. along both axes |
| Doped | 27 v. % TiO$_2$ (example 3) | DMS E01 | 6.6 | 15 | 8.4 | ~1 V | 48 | 90$^a$ reor., follow polarity |
|  | 9 v. % TiO$_2$ (example 3) |  |  | 3 | -3.6 | ~1 V | 42 | 90$^a$ reor., follow polarity |
|  | 5 v. % CB |  |  | 10 | 3.4 | ~1 V | 38 | 90$^a$ reor. along boh axes | stants was smaller (or $\epsilon_p$-$\epsilon_h$=3.6), the reorientation time of flakes was ~20 s at a field of 1V applied to an 80 µm cell (12.5 mV/µm) and 0.01 Hz frequency. When the difference in dielectric constants was bigger ($\epsilon_p$-$\epsilon_h$=8.4), the reorientation time was less than 10 s.

Thus, doped PCLC flake materials systems may be formed either by mixing the dopant directly into the molten PCLC material at elevated temperature or by first dissolving the PCLC material in the solvent and then dispersing the dopant within the solution by ultrasonication. One method of forming doped PCLC flakes is by casting of either the neat (undiluted) or the solvent-diluted PCLC material as a film onto an appropriate substrate and thermally fracturing the film into doped flakes of irregular sizes and shapes. Casting from solution is the preferred approach if a high degree of dopant homogeneity is desired in the PCLC film or flake. Another method is by spreading either the neat or undiluted doped PCLC material at elevated temperature onto a mold containing regularly shaped depressions, as described in U.S. patent application Ser. No. 10/383,603 (Trajkovska-Petkoska, et al), followed by cooling and flexing the mold to produce doped PCLC flakes with highly defined and regular shapes and sizes. A third method makes use of a hydraulic press with heated platens to press a mixture of PCLC material and dopant that had been previously blended (either directly in the solid state or by mixing in solution followed by solvent evaporation) into a film at elevated temperature and pressure.

In addition to using the above methods to produce a single-layer film containing the dopant, the above processes can also be used to produce multi-layer PCLC films and flakes composed of combinations of layers with different doping levels and different doping materials, and/or different selective reflection colors or handedness to form materials with an extremely wide range of electrical and optical properties that can be tailored for specific device applications. The combination of layers with different levels of doping makes it possible to produce flakes that have a controllable, dopant concentration gradient across the bulk cross-section of the flake.

The examples below illustrate the many different ways that doped PCLC films and flakes can be formed. Useful dopants can be titanium dioxide ($TiO_2$), carbon black, and carbon single-wall nanotubes (SWNT), or oil-soluble organic dyes. Organic (i.e., carbon containing) dopants are generally preferred over inorganic dopants. Examples of useful carbon black dopants include Vulcan PA90 or Monarch 120 made by Cabot Corp., while carbon SWNTs produced by Carbolex, Inc. and Sigma Aldrich are specific examples of useful carbon nanotube dopants. Suitable oil-soluble organic dye dopants are Sudan Black B (Sigma Aldrich) and Orasol Black BL (a commercially available textile dye).

EXAMPLE 4

Irregularly-Shaped Doped PCLC Flakes

Irregularly-shaped, single-layer doped PCLC flakes are prepared by mixing, crushing, and grinding the PCLC material and dopant material together in a vibrational grinding apparatus (such as a Wig-L-Bug dental amalgalm grider) for several minutes until a uniform consistency is obtained. The preferred dopant concentration range can be be between 0.5 and ~30 vol. % of the entire mixture. Films and flakes composed of the doped PCLC material are prepared according to the same procedures as described in U.S. Pat. No. 6,665,042 (Marshall et al.).

EXAMPLE 5

Doped PCLC Flakes with Specific Shapes and Sizes

Single-layer doped PCLC flakes in specific shapes and sizes are prepared using the mixing and grinding process described in Example 4 and then using the doped material to prepare shaped flakes according to the soft lithography process described in U.S. patent application Ser. No. 10/383,603, (Trajkovska-Petkoska, et al.), also herein incorporated by reference.

EXAMPLE 6

Single-Layer Doped PCLC Flakes Formed by a Hot-Melt Process

PCLC flakes may be made using the mixing and grinding process described in Example 4, followed by placing the mixture between two Kapton films in a fixture that is in contact with a set of heated platens contained within a 20 ton hydraulic press. The platens are pre-heated to 130° C. and the doped PCLC mixture is compressed using 4 tons of applied pressure for 5 minutes. The fixture containing the film is removed and placed in a water-cooled compartment for 5 min. and the films is removed from the Kapton sheets and processed into irregularly shaped flakes as described in U.S. Pat. No. 6,665,042 (Marshall et al.), or into regularly-shaped flakes as described in U.S. patent application Ser. No. 10/383, 603, (Trajkovska-Petkoska, et al.).

EXAMPLE 7

Multi-Layer PCLC Flakes Formed by a Hot-Melt Process

Multi-layer PCLC flakes can be formed by following the process described in Example 6 for a single-layer film with the addition that the individual films produced by this process are stacked one on top of another with a layer of polytetraethylene polymer, preferably Kapton, separating the top film of the stack from the top surface of the fixture and a second layer of Kapton separating the bottom film of the stack from the bottom fixture surface. The fixture containing the multi-layer film stack is then placed in the heated platen press and heat and pressure sufficient to laminate the successive film layers together is applied. The required heat, pressure and time interval is generally 130° C., 4 tons and 5 minutes, respectively, as described in Example 6. Cooling of the multi-layer film stack followed by processing into flake form either by the methods of U.S. Pat. No. 6,665,042 (Marshall et al.) or U.S. patent application Ser. No. 10/383,603 (Trajkovska-Petkoska, et al.) are used to generate multi-layer PCLC flakes of irregular or regular shapes and sizes, respectively.

EXAMPLE 8

Multi-Layer PCLC Flakes with a Dopant Concentration Gradient

The process described in Example 7 can be used to form PCLC flakes and films that display a gradient in the dopant concentration over the cross-sectional body of the flake or film. One embodiment of a PCLC flake or film that exhibits a dopant concentration gradient is achieved by laminated together one PCLC layer, e.g., layer 25 of FIG. 2(*d*), that is highly doped and one PCLC layer that is either undoped or doped to only a very low concentration, e.g., layer 26 of FIG. 2(*d*) (Embodiment A). Other embodiments of the flakes 12 involve using three layers FIG. 2(*c*) in which a highly doped PCLC layer 23 is sandwiched between two undoped or lightly-doped PCLC layers 22 and 24 (Embodiment B), or the concentration of dopant in each successive layer 22, 23, 24 increases across the cross-section of the film body (Embodiment C). The above embodiments are presented in Table 5.

TABLE 5

| Embodiment A | First Layer—PCLC + low % dopant |
| | Second Layer—PCLC + high % dopant |
| Embodiment B | First Layer—PCLC + low % dopant |
| | Middle Layer—PCLC + high % dopant |
| | Third Layer—PCLC + low % dopant |
| Embodiment C | First Layer—PCLC + low % dopant |
| | Middle Layer—PCLC + medium % dopant |
| | Third Layer—PCLC + high % dopant |

EXAMPLE 9

Multi-Layer PCLC Flakes Utilizing Different Dopants

Following the procedures described in Examples 7 and 8, multi-layer PCLC flakes and films that exhibit different combinations of dielectric and optical effects are provided by laminating together PCLC layers that each contain a different dopant material in a different concentration. The concentration of dopant in each layer can be either zero (for an undoped layer) or range between 0.5 and 30 vol. %, and can be selected from the preferred dopants (carbon black or carbon nanotubes) or could comprise another inorganic dopant (e.g., titanium dioxide) or organic dopant (e.g., a oil-soluble dye) to achieve additional electrical and/or optical effects. Different dopants, their concentration, and location within the multilayer stack may be selected. The variants in dopants and concentrations of dopants are summarized in Table 6. Oil-soluble dyes such as mentioned above are suitable in the concentration range of 0.5 to 15 wt. %.

TABLE 6

| First Layer—PCLC + ($D_x$, $C_1$) |
| Middle Layer—PCLC + ($D_y$, $C_2$) |
| Third Layer—PCLC + $D_z$, $C_3$) | where $D_x$, $D_y$, and $D_z$ are three different dopant materials selected from the group of preferred dopants; and $C_1$, $C_2$, and $C_3$ are three different dopant concentration levels, ranging from zero (undoped layer) to between 0.5 and 30 vol. % within each layer.

where $D_x$, $D_y$, and $D_z$ are three different dopant materials selected from the group of preferred dopants; and $C_1$, $C_2$, and $C_3$ are three different dopant concentration levels, ranging from zero (undoped layer) to between 0.5 and 30 vol. % within each layer.

Figure 3:
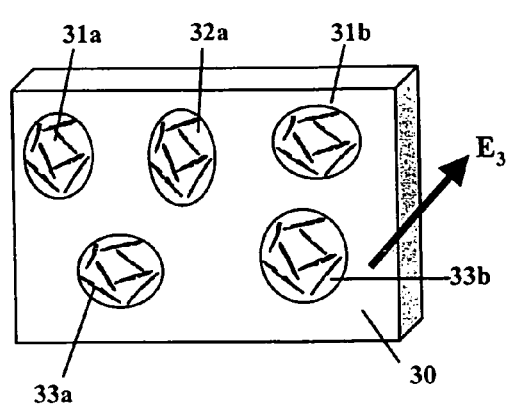
Figure 3:
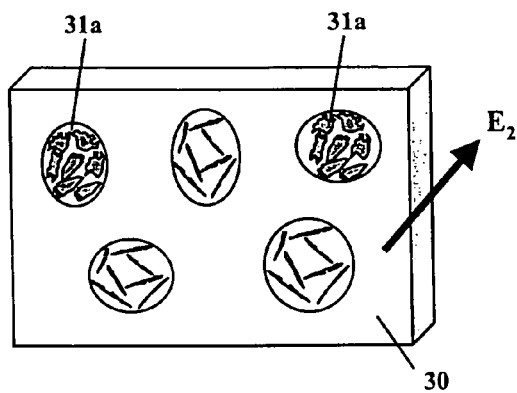
Figure 3:
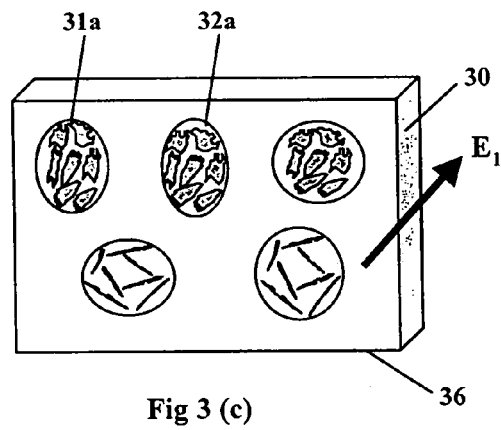
Figure 3:
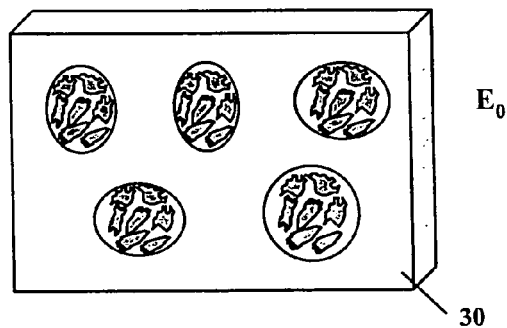

Referring to FIGS. 3(*a*)-(*d*), there is shown fragments of panels 30 having microcapsules made as described in the above referenced U.S. Pat. No. 6,665,042. Systems of flakes and host fluid in different groups of microcapsules may be different. For example, the flakes in group of capsules 31*a*, 31*b*, and capsules similarly situated, may have different dielectric constants than for flakes in another group of capsules 32*a*, 32*b*, and capsules similarly situated. Flakes in a third group of capsules 33*a*, 33*b* and capsules similarly situated have flakes of still different dielectric constant. These dielectric constants are due to different doping materials and/or concentrations in the flakes. The three groups 31, 32 and 33 may reflect in the red, blue and green, respectively. The different dielectric constants enable the groups to be addressed and switched from reflecting to non-reflecting states as by DC voltages of different magnitude. The system therefore provides a panel for creating multi-color displays for imaging (TV graphics) and other applications.

From the foregoing description it will be apparent that there has been provided improved electric-optic devices wherein the improvement is provided by the use of doped electric optic material (PCLC preferably). Flakes doped with light absorbing material also provide improved optical characteristics by reducing the effects of scattered or transmitted illumination in reflected light from the flakes. Variations and modifications in the herein described devices and flakes, within the scope of the invention, will undoubtedly suggest themselves to those skilled in the arts. Accordingly the foregoing description should be taken as illustrative and not in a limited sense.

The invention claimed is:

1. An optical device comprising a system of flakes suspended in a fluid host, said flakes having a matrix of material switchable in orientation in said host in response to an electric field to affect propagation of optical energy incident on said flakes and a dopant of soluble or insoluble material distributed inside said matrix which changes the switchability of said flakes.

2. The device according to claim 1 wherein the dopant is solely particulate material and the soluble material is dissolved in the matrix.

3. The device according to claim 2 wherein said dopant has a dielectric characteristic different with respect to the dielectric characteristic of said material of said matrix or having a concentration which provides said changes of switchability of said flakes.

4. The device according to claim 3 wherein said dielectric characteristic of said dopant is a dielectric constant which is higher than the dielectric constant of said material of said matrix.

5. The device according to claim 3 wherein said host has a dielectric constant and said dielectric constant of said doped flakes is higher than the dielectric constant of said host.

6. The device according to claim 2 wherein said dopant density provided by said particles is insufficient to substantially increase the density of said flakes composing the flake matrix and dopant to match the density of the fluid host.

7. The device according to claim 6 wherein said dopant density is the same or less than the density of said flakes composed of the dopant and base matrix.

8. The device according to claim 1 wherein said material of said matrix is a polymer liquid crystal (PLC) material and said soluble material is an oil-soluble organic dye.

9. The device according to claim 8 wherein said PLC material is a polymer cholesteric liquid crystal material (PCLC).

10. The device according to claim 2 wherein said particulate dopant material is selected from the group consisting of titanium dioxide, barium titanate, carbon and metal, and said soluble material is an oil-soluble organic dye.

11. The device according to claim 8 wherein said particulate dopant material is selected from the group consisting of titanium dioxide, barium titanate, carbon and metal, and the oil soluble material is selected from the group consisting of Sudan Black B and Orasol Black BL.

12. The device according to claim 1 wherein said insoluble dopant material is selected from carbon black and carbon nanotubes.

13. The device according to claim 1 wherein said insoluble dopant material is provided by carbonyl iron.

14. The device according to claim 1 wherein said soluble material is an oil-soluble organic dye.

15. The device according to claim 14 wherein said dye is selected from the group consisting of Sudan Black B and Orasol Black BL.

16. The device according to claim 2 wherein said dopant material is homogeneously distributed in said matrix.

17. The device according to claim 2 wherein said dopant material is non-homogeneously distributed in said matrix.

18. The device according to claim 17 wherein said non-homogeneous distribution is in accordance with a selected concentration density gradient between opposite surfaces of said flakes.

19. The device according to claim 18 wherein said gradient is provided by a plurality of layers in said flake having different concentrations of said dopant material.

20. The device according to claim 18 wherein particles of said particulate material are of different material in different ones of said layers.

21. The device according to claim 1 wherein said matrix is provided by polymerized liquid crystal material in which said dopant is dispersed.

22. The device according to claim 21 wherein said dopant is dispersed in said matrix upon solidification of a solution of said polymerized liquid crystal material in a solvent in which solution said dopant is mixed with said liquid crystal material.

23. The device according to claim 1 wherein said dopant is distributed by dispersal of dopant particles of said insoluble material and particles of material which provide said matrix from which said flakes are provided, which particles of matrix material and dopant material are integrated into an integral body by pressure.

24. The device according to claim 23 wherein said flakes are formed from fractured plates or foil of said pressure integrated matrix and said dopant particles.

25. The device according to claim 1 wherein said different ones of said flakes have different dopant materials therein having different dielectric characteristics or concentrations.

26. The device according to claim 25 wherein said flakes are of PLC material having reflectivity in different parts of the spectrum of said energy.

27. The device according to claim 25 wherein said reflectivity of different ones of said dopant materials is in the red, blue and green portion of said spectrum.

28. The device according to claim 26 wherein said flakes having different reflectivity and different dopant materials are separated from each other in groups distributed over a surface from which images are reflected in response to electrical addressing having characteristics which provide selected switching of said flakes in different ones of said groups.

29. Flakes providing optical reflectivity comprising a matrix of PLC material in which a dopant is distributed, said dopant being light absorbing particles, and said dopant decreases the intensity of scattered light in the light reflected by said PLC material.

30. The flakes according to claim 29 wherein said particles are microscopic size carbon black or carbonanotubes.

31. The flakes according to claim 29 wherein said flakes are electrically addressable to switch the orientation thereof between reflecting and non-reflecting states while suspended in a host fluid.

32. The flakes according to claim 1 wherein said dopant is light absorbing material soluble in said flake matrix.

33. The flakes according to claim 32 wherein said soluble material is an oil-soluble organic dye.

* * * * *